(12) United States Patent
Puhala et al.

(10) Patent No.: US 9,410,031 B2
(45) Date of Patent: Aug. 9, 2016

(54) ORGANIC FUNCTIONALIZATION OF LAYERED DOUBLE HYDROXIDES

(75) Inventors: Aaron S. Puhala, Kent, OH (US); Xiaofan Luo, Cleaveland, OH (US)

(73) Assignee: Flow Polymers, LLC, Cleveland, OH (US)

( * ) Notice: Subject to any disclaimer, the term of this patent is extended or adjusted under 35 U.S.C. 154(b) by 174 days.

(21) Appl. No.: 13/528,092

(22) Filed: Jun. 20, 2012

(65) Prior Publication Data
US 2013/0005871 A1    Jan. 3, 2013

Related U.S. Application Data

(60) Provisional application No. 61/502,005, filed on Jun. 28, 2011.

(51) Int. Cl.
| | | |
|---|---|---|
| *C08K 5/098* | (2006.01) | |
| *C08K 9/04* | (2006.01) | |
| *C09C 1/42* | (2006.01) | |
| *C08L 23/28* | (2006.01) | |

(52) U.S. Cl.
CPC ............. *C08K 9/04* (2013.01); *C08L 23/283* (2013.01); *C09C 1/42* (2013.01); *C01P 2002/72* (2013.01); *C01P 2002/82* (2013.01); *C01P 2002/88* (2013.01)

(58) Field of Classification Search
CPC ........... C08K 9/04; C08L 23/283; C08L 7/00; C08L 21/00; A01N 59/04; A01N 2300/00; A01N 25/00; A01N 25/30; C01P 2002/72; C01P 2002/82; C01P 2002/88; C09C 1/42; C09C 3/08
USPC .......................................... 524/71, 301, 313
See application file for complete search history.

(56) References Cited

U.S. PATENT DOCUMENTS

| 7,786,202 B2 | 8/2010 | Schomaker et al. ........... 524/381 |
| 7,968,740 B2 | 6/2011 | Winters et al. ................ 556/182 |
| 8,551,743 B2 * | 10/2013 | Basheer .................... C11C 3/04 424/94.1 |
| 2008/0293849 A1 | 11/2008 | Winters et al. ................ 523/351 |
| 2011/0000632 A1 | 1/2011 | Talma et al. ........................ 4/76 |

FOREIGN PATENT DOCUMENTS

| IL | WO 2008084470 A2 * | 7/2008 | ................ C11C 3/04 |
| WO | WO 2007/065860 A1 | 6/2007 | ............... C08K 9/04 |
| WO | WO 2007065860 A1 * | 6/2007 | |

OTHER PUBLICATIONS

Rahman, Mohd et al. Immobilization of Lipase from Candida rugosa on Layered Double Hydroxides of Mg/Al and its Nanocomposite as Biocatalyst for the Synthesis of Ester. Catalysis Today 93-95 (2004). Elsevier. pp. 405-410.*

* cited by examiner

*Primary Examiner* — Kagnew H Gebreyesus
*Assistant Examiner* — Nghi Nguyen
(74) *Attorney, Agent, or Firm* — Alvin T. Rockhill

(57) ABSTRACT

The present invention relates to a method for preparing an organically functionalized layered double hydroxide which comprises reacting (a) a layered double hydroxide, (b) a triglyceride oil, (c) an enzyme which is capable of catalyzing the hydrolysis of an ester, and (d) water, to produce the organically functionalized layered double hydroxide. The subject invention further reveals a method for preparing an organically functionalized layered double hydroxide which comprises (1) dispersing into an aqueous medium (a) the layered double hydroxide, (b) the triglyceride oil, and (c) the enzyme, (2) allowing the triglyceride oil to hydrolyze into long-chain fatty acids and glycerol to produce a dispersion of the organically functionalized layered double hydroxide; and (3) recovering the organically functionalized layered double hydroxide from the aqueous dispersion.

12 Claims, 7 Drawing Sheets

ORGANIC FUNCTIONALIZATION OF LAYERED DOUBLE HYDROXIDES

This application claims benefit of U.S. Provisional Patent Application Ser. No. 61/502,005, filed on Jun. 28, 2011. The teachings of U.S. Provisional Patent Application Ser. No. 61/502,005 are incorporated herein by reference in their entirety.

BACKGROUND OF THE INVENTION

It is desirable for a wide variety of rubber and plastic articles, such as pneumatic tires, balloons, air springs, gas diaphragms, seals, packaging materials, and the like to exhibit a high level of barrier resistance, such as barrier resistance to gases and liquids. In some cases, such as balloons and pneumatic tires, it is important for the rubber article to prevent the gas from escaping and in other cases, such as gas diaphragms, it is critical for the rubber article to keep gases from leaking through the article. For instance, the desirability for a weather balloon or even a toy balloon to retain the gas with which it is filled is self apparent. It is, of course, also highly desirable for a pneumatic tire to be capable of providing service over longer time intervals without adding additional gas to compensate for leakage. Rubber articles which need enhanced barrier properties frequently include one or more layers of rubber compositions that exhibit good barrier resistance. However, such a layer must also exhibit physical and chemical characteristics which are in accordance with the overall requirements of the rubber article.

Many pneumatic tires, especially pneumatic automobile tires, include an innerliner layer to inhibit the gas used to inflate the tire from escaping. More specifically, pneumatic tires are toroidal, composite structures that are inflated with a pressurized gas, such as air, nitrogen, or helium, to provide weight support, shock absorbance, and traction transmission for a vehicle body. A key factor that affects tire performance is inflation pressure, which needs to be retained at an optimum level during tire operation. Historically, and in some modern tires, inflation pressure was retained through the use of an innertube. In today's tubeless automobile tires, the retention of inflation pressure is achieved by the use of an innerliner which is a thin layer of a rubber composition having a high level of gas barrier resistance which is laminated to the inside of the pneumatic tire. The tire innerliner serves as a barrier layer which helps to inhibit the gas which is used to inflate the tire from escaping and accordingly allows the tire to maintain a proper level of inflation pressure over an extended period of time.

Halobutyl rubbers, such as, bromobutyl rubber and chlorobutyl rubber are typically included in tire innerliners to attain recommended inflation pressures over desired time intervals. In many cases a halobutyl rubber is blended with natural rubber for utilization in tire innerliners. However, bromobutyl rubber and chlorobutyl rubber are expensive materials which add greatly to the cost of materials needed to build a tire. There has accordingly been a long felt need in the tire industry for lower cost innerliner materials or materials with further enhanced gas barrier properties. Such materials would be helpful in addressing the global demand for energy efficient vehicles, reducing carbon dioxide ($CO_2$) emissions and enhancing driving safety. Additional benefits include better tire durability and reduced manufacturing/material cost.

SUMMARY OF THE INVENTION

It is well known that nanoclays with 2-dimensional, platelet-like nanostructures are excellent fillers to improve the barrier properties of polymers. However, the organically functionalized nanoclays that are currently available are both too expensive and poorly designed for utilization in barrier layers of rubber articles, such as in tire innerliner compositions. This invention is based upon new technology which addresses these issues and involves the preparation of novel nanofillers based on organically functionalized layered double hydroxides (organoLDHs) from an enzyme mediated process (an "enzymatic process") that employs renewable triglyceride oils as raw materials. In other words, this invention employs a novel method for preparing 2-dimensional, nanostructured organically functionalized layered double hydroxides by a cost-effective, environmentally benign enzymatic process. This simple process can be used to produce high performance, low cost organoLDH nanofillers that are well suited for utilization in rubber and plastic blends to greatly enhance barrier properties without compromising needed physical and chemical characteristics. The organically functionalized layered double hydroxides made by the method of this invention are accordingly an excellent material for inclusion in rubber and plastic barrier compositions, such as a rubber blend used in making a tire innerliner.

A method for preparing an organically functionalized layered double hydroxide which comprises reacting (a) a layered double hydroxide, (b) a triglyceride oil, (c) an enzyme which is capable of catalyzing the hydrolysis of an ester, and (d) water, to produce the organically functionalized layered double hydroxide.

The subject invention further reveals a method for preparing an organically functionalized layered double hydroxide which comprises (1) dispersing into an aqueous medium (a) the layered double hydroxide, (b) the triglyceride oil, and (c) the enzyme, (2) allowing the triglyceride oil to hydrolyze into long-chain fatty acids and glycerol to produce a dispersion of the organically functionalized layered double hydroxide; and (3) recovering the organically functionalized layered double hydroxide from the aqueous dispersion. The layered double hydroxide which is typically an inorganic layered double hydroxide and the enzyme will normally be added to the aqueous medium as separate components. In other words, the inorganic layered double hydroxide will normally be added to the aqueous medium as a composition which is substantially free or totally void of organic constituents.

The present invention also discloses a hydrocarbon resin composition which is particularly useful in the modification of rubber or plastics which is comprised of (1) an organically functionalized layered double hydroxide and (2) at least one hydrocarbon resin, wherein said hydrocarbon resin composition is in the form of pellets, wherein the hydrocarbon resin is an industrial asphalt having a softening point within the range of 50° C. to 200° C. and a penetration value of less than 15 dmm or wherein the hydrocarbon resin has the organically functionalized layered double hydroxide covalently bonded thereto.

The subject invention further reveals a method for preparing an air blown asphalt composition wherein an organically modified layered double hydroxide is present in the asphalt during the air-blowing process.

DETAILED DESCRIPTION OF THE INVENTION

Figure 1:
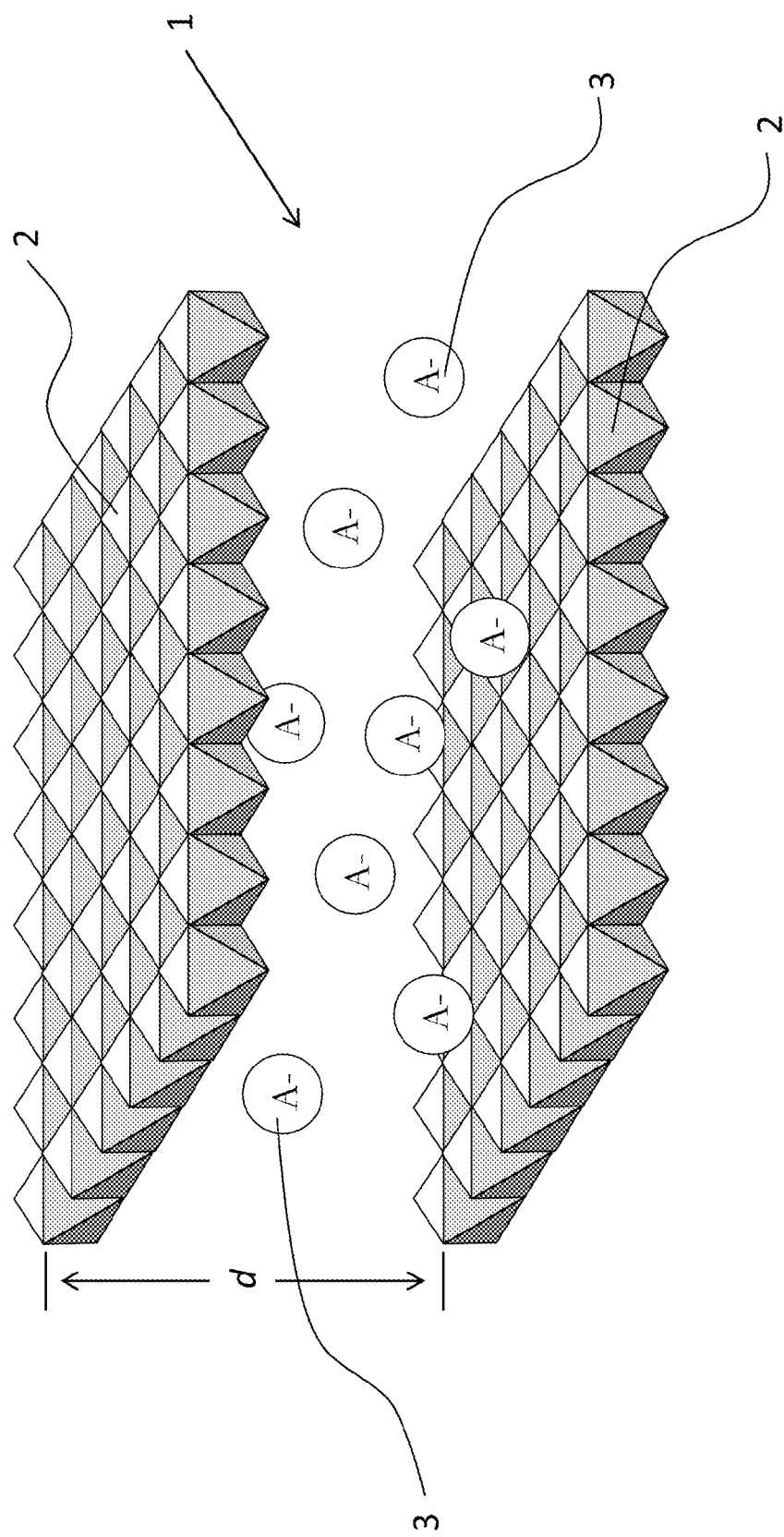
FIG. 1 illustrates a layered nano-structure of layered double hydroxides 1 having LDH layers 2 and interlayer ions $A^-$ 3 with a basal spacing d.

Layered double hydroxides (LDHs) are inorganic materials that are composed of stacked, positively charged layers with charge-balancing interlayer anions (see FIG. 1). This structure resembles that of the more usual, layered silicate-based cationic clays such as Montmorillonite, while the main difference between the two is charge distribution. Cationic clays contain negatively charged layers with charge-balancing interlayer cations, while the reverse is true for layered double hydroxides. Therefore layered double hydroxides are also referred to as anionic clays.

Layered double hydroxides can be represented by the general formula $[M^{z+}_{1-x}M^{3+}_x(OH)_2]^{q+}A^{n-}_{q/n} \cdot mH_2O$, where $M^{z+}$ and $M^{3+}$ represent metal cations with valence z and 3, respectively, with x being equal to the ratio $M^{3+}/(M^{2+}+M^{3+})$ and q being the net charge the LDH layer carries. $A^{n-}$ stands for an interlayer anion of valence n. Most commonly, z represents the integer 2. In cases where z represents 2, the formula can be written more specifically as $[M^{2+}_{1-x}M^{3+}_x(OH)_2]^{x+}A^{n-}_{x/n} \cdot mH_2O$. $M^{2+}$ is typically $Mg^{2+}$, $Zn^{2+}$, or $Fe^{2+}$ and $M^{3+}$ is typically $Al^{3+}$, $Fe^{3+}$, or $Cr^{3+}$. Each double hydroxide layer exhibits a crystal structure similar to brucite $[Mg(OH)_2]$, in which the cation is coordinated octahedrally to 6 hydroxyl groups. Isomorphous replacement of some divalent cations ($M^{2+}$) with trivalent cations ($M^{3+}$) leads to an overall positive charge, and necessitates the presence of interlayer anions ($A^{n-}$) for charge-balancing.

Layered double hydroxides can be either naturally occurring or semi-synthetic. In naturally occurred layered double hydroxides $A^{n-}$ is found to be primarily $CO_3^{2-}$, while synthetic layered double hydroxides can have a variety of different anions such as $OH^-$, $Cl^-$, $NO_3^{2-}$, and $SO_4^{2-}$. In addition to this compositional versatility, synthetic layered double hydroxides also offer better control over purity, particle size and particle size distribution.

Inorganic layered double hydroxides typically have poor compatibility with organic polymers. To effectively utilize them as fillers for polymers, layered double hydroxides need to be organically functionalized. By organically functionalized, it is meant that the inorganic anions are replaced by organic anions. The conventional method to prepare organically functionalized layered double hydroxides involves anion-exchanging an inorganic layered double hydroxide with long-chain fatty acids or fatty acid salts. However, such fatty acids and fatty acid salts, especially those with unsaturation and functional groups are relatively expensive. In many cases the use of co-agents and solvent systems are required adding cost to the production process which can result in price points that limit the commercial potential of the product. Therefore, a better designed process, preferably using less expensive raw materials and a water-based system, is needed to overcome such limits.

The process for preparing organically functionalized layered double hydroxide in accordance with this invention utilizes an inorganic layered double hydroxide, a natural triglyceride oil, and a lipase enzyme which are normally dispersed in an aqueous medium. The inorganic layered double hydroxide utilized as a starting material in the process of this invention will normally be substantially free of organic constituents and is typically void of organic constituents. In this process the natural triglyceride oil is hydrolyzed enzymatically by the lipase to yield long-chain fatty acids and glycerol. Both of these hydrolysis products then participate in the anion exchange process with the inorganic layered double hydroxide. In this process glycerol serves to swell the layered double hydroxide and increase its interlayer spacing. The long-chain fatty acids then undergo an anion exchange with the layered double hydroxide to yield organically functionalized layered double hydroxide bearing alkyl chains which may contain unsaturated carbon-carbon double bonds. The swelling caused by the glycerol allows for the anion exchange to occur under mild conditions and is accomplish in a relatively short reaction time. The glycerol can then be easily washed away when the anion exchange is completed.

The organically functionalized layered double hydroxide can then be utilized as an additive for blending with conventional rubber compounds. During vulcanization, the carbon-carbon bonds of the organically functionalized layered double hydroxide may chemically link to the rubber network, facilitating exfoliation and enabling a strong matrix/filler interface.

The triglyceride oil utilized as a starting material in the process of this invention is typically a plant oil, but can also be an animal oil such as a fish oil. The choice of plant oils as starting material leads to multiple benefits. They are renewable resources with relatively low cost and upon hydrolysis yield glycerol, an important assisting agent that swells the layered double hydroxide layers to facilitate the anion exchange with fatty acids. Most fatty acids from plant oils are unsaturated as illustrated in Table 1. The structural formulas of some common fatty acids are shown in Scheme 1.

TABLE 1

Fatty acid compositions of various plant oils

| Plant Oil | Palmitic (16:0) | Stearic (18:0) | Oleic (18:1) | Linoleic (18:2) | Linolenic (18:3) | Ricon-oleic (18:1, 1 OH) | vernolic (18:1, 1 epoxide) |
|---|---|---|---|---|---|---|---|
| Soybean | 6-10 | 2-5 | 20-30 | 50-60 | 5-11 | — | — |
| Corn | 8-12 | 2-5 | 19-49 | 34-62 | — | — | — |
| Linseed | 4-7 | 2-4 | 25-40 | 35-40 | 25-60 | — | — |
| Castor | 0.5-1 | 0.5-1 | 2-6 | 1-5 | 0.5-1 | 85-95 | — |
| Vernonia | — | — | — | — | — | — | 73-80 |

Scheme 1. Representative FAs available from plant oils.

(1)

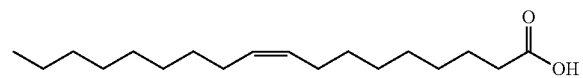

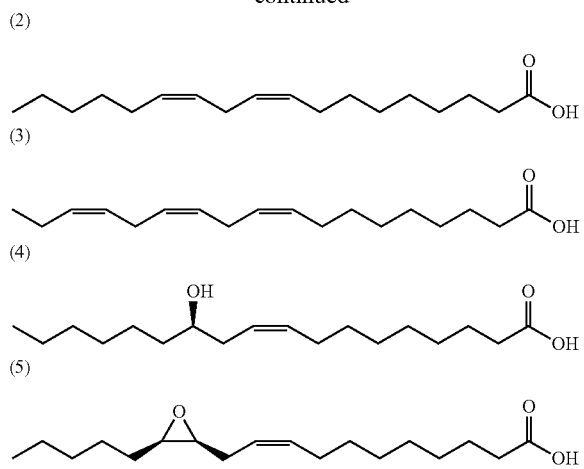

(1) Oleic acid, (2) linoleic acid, (3) linolenic acid, (4) ricinoleic acid (from castor oil), and (5) vernolic acid (from vernonia oil).

The utilization of unsaturated fatty acids in innerliners is beneficial since carbon-carbon double bonds can chemically link to the rubber network to provide a strong interface and facilitate exfoliation. It is also noted that many fatty acids contain additional functional groups that may facilitate their use in other applications. For example, ricinoleic acid functionalized layered double hydroxides can be used for polyurethanes (as chain extenders) or polyesters (as the initiator for ring-opening polymerization) for barrier coatings and food packaging; vernolic acid functionalized layered double hydroxides can be formulated into epoxy thermosets to further enhance their barrier and mechanical properties for applications such as cryogenic fuel tanks. Some representative examples of triglyceride oils that can be used include palm oil, soybean oil, rapeseed oil, sunflower seed oil, peanut oil, cottonseed oil, palm kernel oil, coconut oil, olive oil, corn oil, grape seed oil, hazelnut oil, linseed oil, rice bran oil, safflower oil, sesame oil, walnut oil, vernonia oil, castor oil, chestnut oil, other nut oils, other plant-derived oils, animal-derived oils and fish oils. The triglyceride oil can be an epoxidized triglyceride oil, a halogenated triglyceride oil, or a hydrogenated triglyceride oil. The triglyceride oil can also optionally be chemically modified with one or more functional groups or it can be unfunctionalized.

Traditionally, triglyceride fats and oils are hydrolyzed by a physicochemical process that typically involves high pressure and temperature. Enzymatic hydrolysis by lipase provides an energy-efficient and sometimes more cost-effective alternative and is gaining more industrial importance. This is especially favored for plant oils as to minimize the oxidation of unsaturated double bonds and other side reactions.

The triglyceride oil will, of course, be enzymatically hydrolyzed in the presence of at least a stoichometric amount of water wherein the amount of water is at least 3 moles per mole of triglyceride oil. The amount of triglyceride oil used provides an anion exchange capacity which is within the range of 0.1 to 5 molar equivalents of the long chain fatty acids per 100 grams of layered double hydroxide. The amount of triglyceride oil used typically provides an anion exchange capacity which is within the range of 0.5 to 3 molar equivalents of the long chain fatty acids per 100 grams of layered double hydroxide and more typically the amount of lipase enzyme present is within the range of 0.1 to 10 weight percent, based upon the weight of the triglyceride oil. AEC defines the maximum amount of anions that can be exchanged from a given LDH. It is expressed in the unit of eq/100 g or meq/100 g (eq: molar equivalent or equivalent; meq: milliequivalent). In other words, it is the moles (or millimoles) of monovalent anions that can be exchanged per 100 g of LDH.

It is generally advantageous for the triglyceride oil, the layered double hydroxide, and the enzyme to be dispersed in an aqueous medium in which the hydrolysis is conducted. In many cases the triglyceride oil will be at least partially hydrolyzed prior to the introduction of the layered double hydroxide. The enzyme can be bacterial enzyme, an animal enzyme, a plant enzyme, or a fungal enzyme. However, a fungal or bacterial lipase is typically utilized. The enzymatic hydrolysis is typically conducted at a temperature which is within the range of about 10° C. to about 90° C. and is more typically conducted at a temperature which is within the range of 20° C. to about 70° C. The enzymatic hydrolysis is preferably conducted at a temperature which is within the range of about 30° C. to about 50° C. The enzyme can be either in a free or an immobilized form, and can be recycled and reused multiple times. After the triglyceride oil is hydrolyzed and the long-chain fatty acids has undergo an anion exchange with the layered double hydroxide to yield organically functionalized layered double hydroxide it may be desirable to wash the product with an organic solvent to remove residual triglyceride oils and residual long-chain fatty acids. Some representative examples of organic solvents that can be used include alcohols, acetone, ethyl acetate, and alkanes containing from about 5 to 10 carbon atoms.

The organically functionalized layered double hydroxide made by the process of this invention can then be blended into rubber and plastic polymers, including thermosetting and thermoplastic polymers, thermoplastic elastomer, thermoplastic vulcanizates and blends of these polymers to improve the barrier characteristics thereof. Typically the organically functionalized layered double hydroxide will be blended into rubber polymers, such as butyl rubber (IIR), halobutyl rubber (bromobutyl rubber (BIIR) and chlorobutyl rubber (CIIR)), natural rubber (NR), synthetic polyisoprene rubber (IR), polybutadiene rubber (BR), ethylene-propylene rubber (EPR), ethylene-propylene diene monomer rubber (EPDM), nitrile butadiene rubber (NBR), carboxylated nitrile rubber (XNMR) hydrogenated nitrile butadiene rubber (HNBR), polychloroprene rubber (CR), fluoroelastomer (FKM), polyacrylate rubber (ACM), styrene-butadiene rubber (SBR), other rubbers and blends of these rubbers. Some representative examples of plastics into which they can be blended include polyolefins, polyamides, polyesters, polyurethanes, epoxy resins, and polycarbonates. Typically, such rubber polymers will have a glass transition temperature of below about 20° C. and more typically below about 0° C. with the plastics having a glass transition temperature or a melting point above about 20° C. and more typically above about 40° C. The organically functionalized layered double hydroxide will normally be blended into the rubber or plastic material at a level which is within the range of about 0.1 php (parts by weight per 100 parts by weight of polymer) to about 40 php. The organically functionalized layered double hydroxide will more typically be blended into rubber polymers or plastics at a level which is within the range of 1 php to 10 php.

The organically functionalized layered double hydroxide made by the process of this invention can then be blended into industrial asphalt compositions to make useful additives for rubber and plastic. Such industrial asphalt will typically have a softening point which is within the range of 122° F. (50° C.) to 392° F. (200° C.) and a penetration value less than 15 dmm. In most cases the industrial asphalt will have a softening point which is within the range of 158° F. (70° C.) to 356° F. (180°

C.). Such industrial asphalt may be a non-air blown asphalt or an air-blown asphalt. In the case of an air blow asphalt, the organically functionalized layered double hydroxide may be incorporated into the asphalt prior to air blowing such that the organically functionalized layered double hydroxide is present in the asphalt during the air blowing process or it may be blended into the air blown asphalt after the air blowing process. It is anticipated that incorporation of the organically functionalized layered double hydroxide prior to air blowing will provide improved dispersion and exfoliation of the organically functionalized layered double hydroxide in the asphalt due to the energetics of the air blowing process. It is further anticipated that the energetics of the air blowing process may result in chemical bonding of the organically functionalized layered double hydroxide to the asphalt. Penetration values can be determined at room temperature or at an elevated temperature. Unless stated otherwise, penetration values are determined at room temperature. For purposes of this invention, asphalt softening points are measured following ASTM D 36-95 "Standard Test Method for Softening Point of Bitumen (Ring-and Ball Apparatus)" and asphalt penetrations are measured following ASTM D 5-97 "Standard Test Method for Penetration of Bituminous Materials".

The organically functionalized layered double hydroxide made by the process of this invention can also be blended into other hydrocarbon resins. These hydrocarbon resins are organic substances which have low to medium molecular weights (typically less than 10,000 g/mol) that are mostly amorphous. Hydrocarbon resins can be both natural and synthetic, and usually have complex structures and compositions. Hydrocarbon resins have a variety of industrial applications, including applications in tires and tire innerliners. For example, Promix® 400 homogenizing agent, a product of Flow Polymers, LLC that is composed of a blend of various hydrocarbon resins, is used in tire innerliners as a "homogenizing agent" that improves the compatibility of different elastomers. Hydrocarbon resins can be used as a medium to disperse and deliver nanoclays, including the LDH products manufactured by the disclosed process, to prepare a masterbatch material that can be easily used in tire manufacturing as well as various other industrial processes. Examples of hydrocarbon resins that are suitable for this purpose are: asphalt, bitumen, indene-coumarone resins, C9 resins, C5 resins, dicyclopentadiene (DCPD) resins, polyterpene resins, polybutene resins, rosin acids, rosin esters, dimerized rosin resins, etc.

Pellets of the hydrocarbon resin composition can be produced utilizing pelletizing methods such as rotoforming, water dropping, spraying, underwater pelletizing, strand cutting, and flaking. Pellets of the hydrocarbon resin composition of this invention can be of various shapes that allow for good free-flow during storage, handling, and processing. For instance, the pellets of the hydrocarbon resin composition can be in the form of pastilles, cubes, cylinders, discs, spheres, rods, briquettes, or granules. To attain the best possible free-flow characteristics it is normally preferred for the hydrocarbon resin composition to be in the form of pellets having a generally spherical or cylindrical shape. The size of the pellets can vary widely. However, such pellets will typically weigh from about 0.02 grams to about 0.8 grams and will more typically weigh from about 0.04 grams to about 0.5 grams. It is typically preferred for pellets of the hydrocarbon resin composition of this invention have a weight which falls within the range of 0.08 grams to 0.2 grams.

Combining the Enzymatic Process with LDH Synthesis (In-Situ Formed LDH)

The disclosed enzymatic process can be combined with the synthesis of LDH, i.e. with LDH formed in-situ in the process. There are multiple methods to prepare LDHs and are well known in the literature (e.g. Evans and Duan, Chemical Communications, 2006, 485-496; and U.S. Pat. No. 7,786,202 and U.S. Pat. No. 7,968,740 of Akzo Nobel). These methods typically involve (1) dissolving or suspending a divalent metal ($M^{2+}$) species and a trivalent metal ($M^{3+}$) species in a liquid medium, (2) adding to the medium a species that contains the desired interlayer anion, and (3) treating the system (pH, heat, pressure, etc.) to induce the formation and precipitation of LDH. As can be easily envisioned, this can be easily combined with the disclosed enzymatic process to allow the formation of LDH and organic functionalization of LDH to occur in a unified, single process.

Combining the Enzymatic Process with Enzymatic Polymerization (In-Situ Polymerization and LDH Functionalization)

The disclosed enzymatic process to prepare organically functionalized LDHs may also be combined with other enzyme-catalyzed or enzyme-mediated processes. One example of such processes is lipase catalyzed polymerization to prepare polyesters ("Enzymatic Polymerization to Polyesters", in book Biopolymers Online, John Wiley & Sons, Inc., 2005). In one embodiment of this reaction can be carried out together with the disclosed enzymatic process to generate in-situ formed LDH/polymer nanocomposites which can have advanced properties. Such a combined process can be conducted in water, organic solvents or ionic liquids.

Application of the Process of this Invention to Other Raw-Material/Enzyme Combinations The enzymatic process of this invention can be applied to utilize other raw materials that can be enzymatically treated to generate carboxyl groups. Examples of possible raw materials and enzymes (besides triglyceride oils and lipase) are: esters or polyesters with esterase/lipase; proteins, peptides with protease/peptidase; amides with amidase.

Use of a Surfactant

In one embodiment of this invention the enzymatic process can be conducted in the presence of a surfactant. A number of studies have suggested that the use of certain surfactants can accelerate the lipase-hydrolysis reaction (e.g. Goswami et al., Bioresource Technology, 2010, 6-13, Noor et al., Process Biochemistry, 2003, 13-20, Polizelli and Tiera, Journal of the American Oil Chemists' Society, 2008, 749-753). The use of particular surfactants may also suppress the crystallization of high melting-temperature triglycerides (e.g. hydrogenated vegetable oils and animal fats), allowing the enzymatic process to occur at moderate temperatures. A surfactant also renders the reaction mixture more homogeneous and therefore improves processability.

The surfactant can be either ionic or non-ionic. Some representative examples of ionic surfactants that can be utilized include: alkyl sulfates, such as ammonium lauryl sulfate, sodium lauryl sulfate; alkyl ether sulfates, such as sodium lauryl ether sulfate (SLES), sodium myreth sulfate; docusates (dioctyl sodium sulfosuccinate); sulfonate fluorosurfactants, such as perfluorooctanesulfonate (PFOS), perfluorobutanesulfonate; alkyl benzene sulfonates; alkyl aryl ether phosphate; alkyl ether phosphate; alkyl carboxylates, such as fatty acid salts/soaps; sodium lauroyl sarcosinate; carboxylate fluorosurfactants, such as perfluorononanoate, perfluorooctanoate (PFOA or PFO); organic amines, and ammonium and quaternary ammonium salts. Some representative examples of non-ionic surfactants that can be used include: fatty alcohols; polyoxyethylene glycol alkyl ethers; polyoxypropylene glycol alkyl ethers; glucoside alkyl ethers; polyoxyethylene glycol octylphenol ethers; polyoxyethylene glycol alkylphenol ethers; glycerol alkyl esters; polyoxyethylene glycol sorbitan alkyl esters; sorbitan alkyl esters; cocamide MEA; cocamide DEA; dodecyldimethylamine oxide; block copolymers of polyethylene glycol and polypropylene glycol; and polyethoxylated tallow amine (POEA).

Testing of Organically Functionalized LDH Product

The organically functionalized LDH product can be characterized in a number of ways. Fourier transform infrared spectroscopy (FTIR) is a useful technique to examine the existence of organic molecules. Thermogravimetric analysis (TGA) is useful in determining the composition, especially the organic content, of the LDH product (Nhlapo et al., Journal of Materials Science, 2008, 1033-1043). TGA is normally conducted by heating a small amount of material at a constant heating rate (e.g. 20° C./min) to an elevated temperature (e.g. 800° C.) under a purge gas of either air or nitrogen, while recording sample weight as a function of temperature. During heating, all organic content would degrade and the LDH layers would become mixed metal oxides of the divalent and trivalent metals. Therefore, by analyzing the weight remaining data at elevated temperatures the organic content of the LDH product can be calculated or estimated. X-ray diffraction (XRD) is another important technique to study the structure of LDHs. Particularly, it gives a measure of the basal spacing (average spacing between two adjacent LDH layers), which appears as d(001) diffraction peaks on the diffraction pattern, or diffractogram. Therefore XRD can be used to verify the intercalation of organic molecules, which would result in "swelling" of the LDH layers or a significant increase in basal spacing. XRD can also be used to study the exfoliation of LDHs in their blends with hydrocarbon resins or polymers. Although characterization of complete nanoclay exfoliation remains an analytical challenge, it is generally concluded from the disappearance of basal plane diffractions from the original LDH.

Controlling the Level of Functionalization

It is frequently important to control the level of organic functionalization, i.e. the content of organic substances in the final LDH product. This can be achieved in the disclosed process by varying the amount of triglyceride oil from 0 to the amount allowed by the anion exchange capacity (AEC) of the LDH or higher.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Preparation of LDH Functionalized with Soybean Oil

An inorganic LDH under the trade name Perkalite® LD, commercially available from AkzoNobel Chemicals was utilized in this experiment. This LDH contains OH⁻ as the main interlayer anion. Lipozyme® TL 100L, commercially available from Novozymes, Inc., was used as the enzyme catalyst. It contains the lipase from *thermomyces lanuginosus* in an aqueous solution form.

In the procedure used, 100 grams of Perkalite® LD, 250 grams of soybean oil (USP grade) and 450 grams of de-ionized water were weighed and added to a glass reaction vessel. The system was purged with a constant flow of nitrogen gas and mechanically mixed. Then, 5 grams of Lipozyme® enzyme was added. The mixture was allowed to react for 24 hours at room temperature (about 21° C.) with no heat being applied. After the reaction was allowed to proceed, the resulting slurry-like mixture which resulted was centrifuged to separate the solids from the liquid. The collected solids were washed using first de-ionized water and was subsequently washed with acetone. The washing liquid was removed by centrifuging after each washing step. The solid LDH product was finally dried in an oven which was maintained at a temperature of 60° C. to 80° C. overnight with a final yield of 286.9 grams being recovered.

Figure 2:
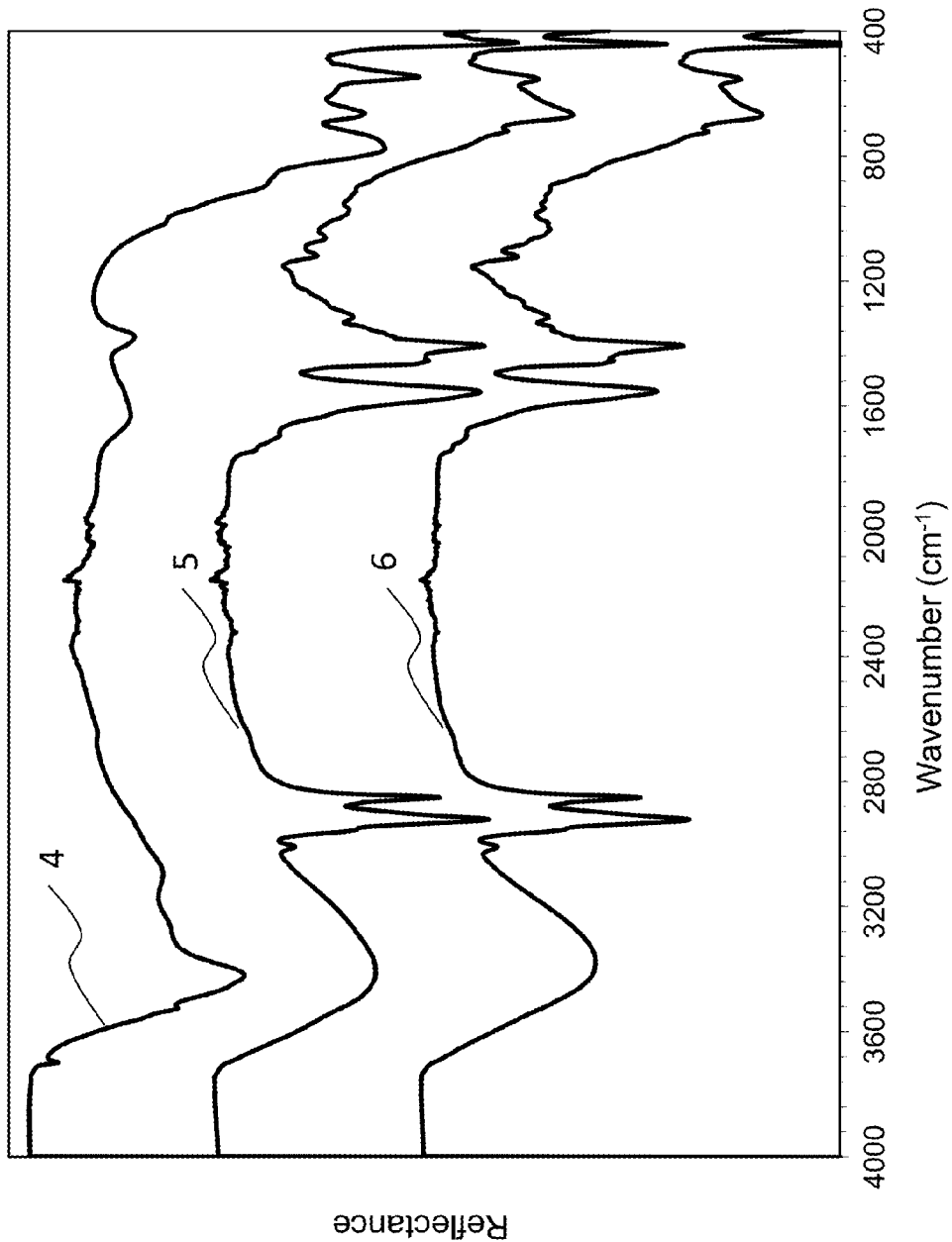
FIG. 2 illustrates FTIR traces showing the Perkalite® LD 4 inorganic LDH from Example 1, the soybean oil functionalized LDH product 5 from Example 1, and the castor oil functionalized LDH product 6 from Example 2.
Figure 3:
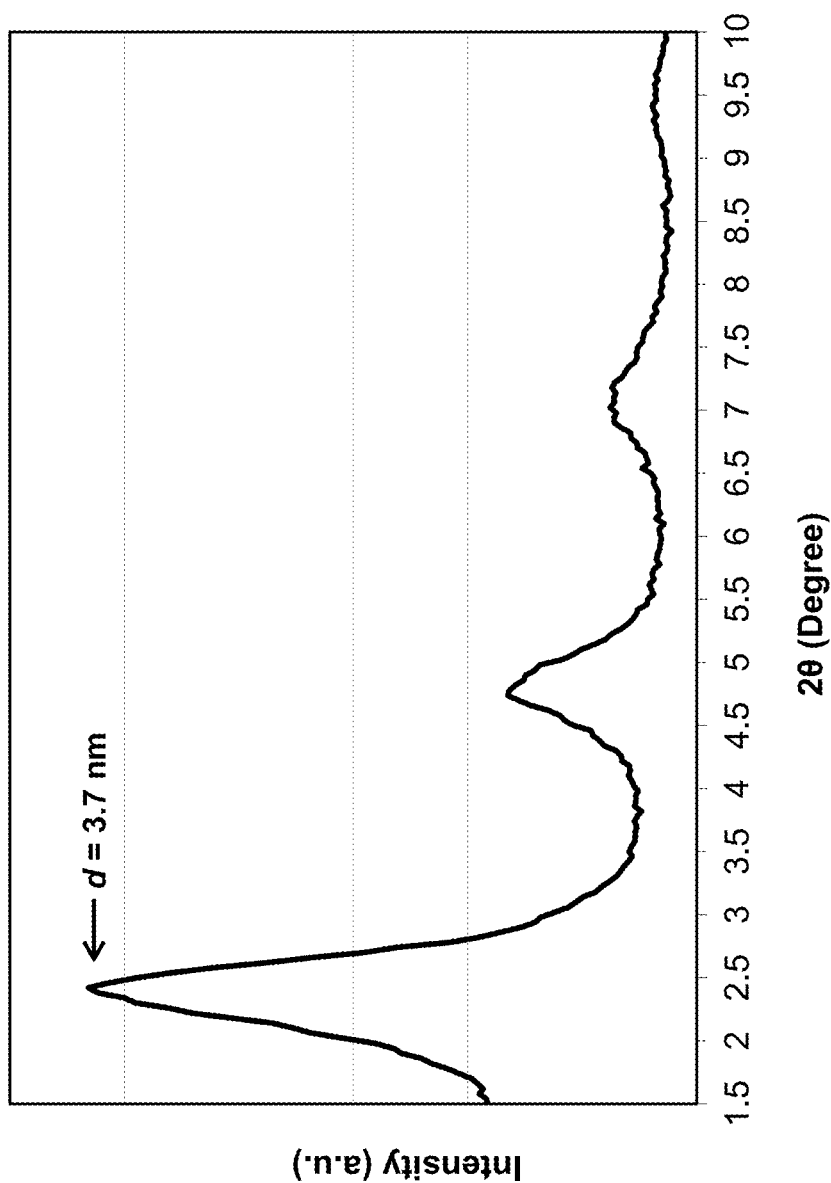
FIG. 3 illustrates the X-ray diffraction profile of soybean oil functionalized LDH from Example 1.
Figure 4:
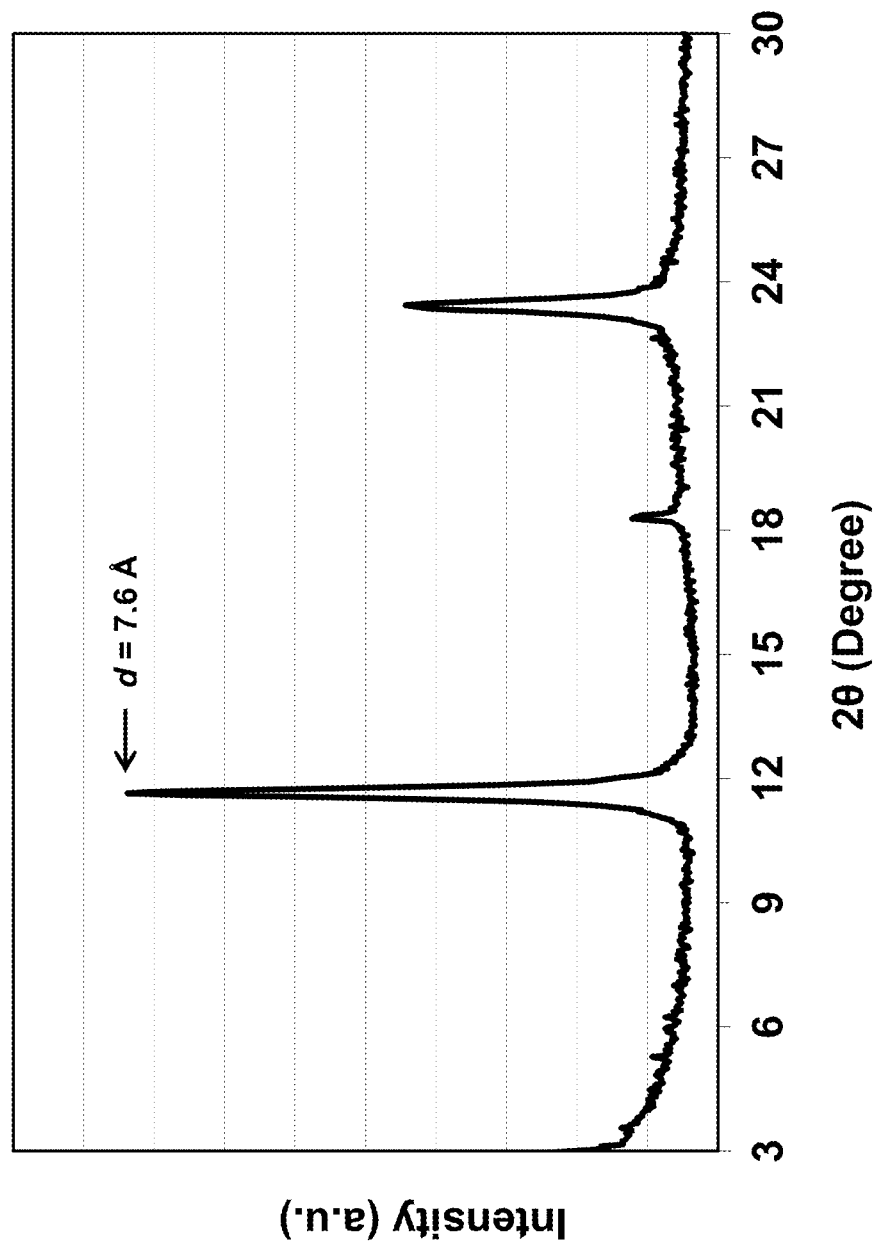
FIG. 4 illustrates the X-ray diffraction profile of Perkalite® LD inorganic LDH.

The dried product was characterized using Fourier transform infrared spectroscopy (FTIR) and wide angle X-ray diffraction (XRD). The FTIR spectrum detected is for this sample is shown in FIG. 2 as trace 5. Compared to Perkalite® LD (trace 4 in FIG. 2), the functionalized LDH product showed clear presence of fatty acid molecules from the C-H stretching peaks (2800-3000 cm$^{-1}$) and C=O stretching peaks (asymmetric stretching peak at about 1555 cm$^{-1}$ and symmetric stretching peak at about 1405 cm$^{-1}$). The positions of the C=O peaks also suggest that it is primarily in the carboxylate (COO—) form. XRD (FIG. 3) showed that the LDH product has a basal spacing of 3.7 nm, significantly larger than Perkalite® LD (FIG. 4) which has a basal spacing of 7.6 Å or 0.76 nm.

Example 2

Preparation of LDH Functionalized with Castor Oil (LDH-Ricinoleate)

Figure 5:
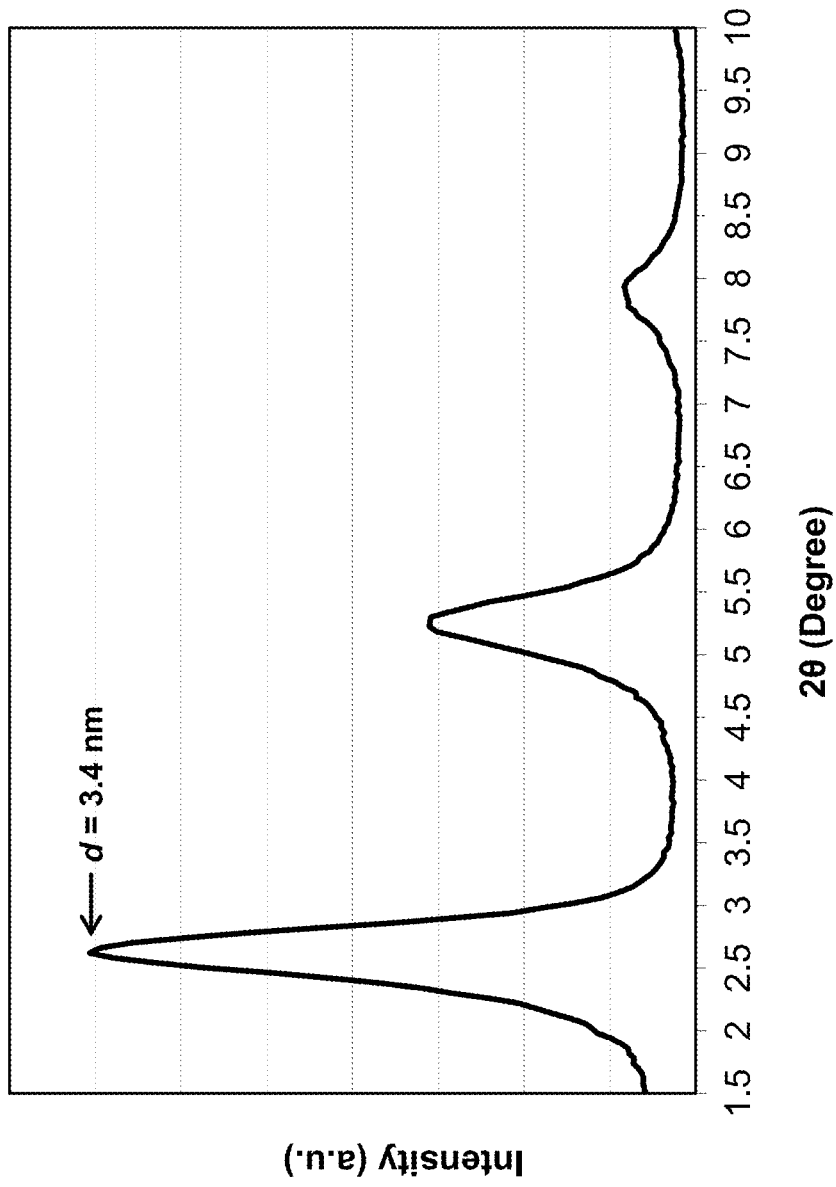
FIG. 5 illustrates the X-ray diffraction profile of the castor oil functionalized LDH product from Example 2.

This experiment was conducted under the same conditions as described in Example 1, except that castor oil (USP grade) was used in the procedure used instead of soybean oil. In this procedure 274.9 grams of product was recovered. The FTIR curve of the product is shown as trace 6 in FIG. 2, which clearly indicates the presence of intercalated fatty acid molecules. XRD (FIG. 5) shows that the product had a basal spacing of 3.4 nm.

Example 3

Preparation of LDHs with Different Levels of Soybean Oil Functionalization

LDHs with different levels of soybean oil functionalizations were prepared by varying the amount of soybean oil and enzyme (kept it constant at 2% of the level of soybean oil used). The sample compositions are listed in Table 2.

TABLE 2

List of samples and their compositions for Example 3

| Sample Name | Soybean Oil (g) | Lipozyme ® TL 100L (g) | Perkalite LD (g) | Water (g) |
|---|---|---|---|---|
| LDH-SB50 | 50 | 1 | 100 | 600 |
| LDH-SB100 | 100 | 2 | 100 | 600 |
| LDH-SB125 | 150 | 2.5 | 100 | 600 |
| LDH-SB150 | 150 | 3 | 100 | 600 |
| LDH-SB50 | 250 | 5 | 100 | 600 |

For each sample, the soybean oil, Perkalite® LD inorganic LDH and water were weighed and added to a 1-liter reaction vessel and mechanically stirred. Lipozyme® TL 100L enzyme catalyst was then quickly added and the mixture was allowed to react at room temperature (~21° C.) for 24 hours. After the reaction, the resulting slurry was centrifuged to remove the liquid phase. The solid product was washed using first de-ionized water and was subsequently washed with acetone. The washing liquid was removed by centrifuging after each washing step. The final product was dried in an oven at a temperature of 60° C. to 80° C. overnight.

Figure 6:
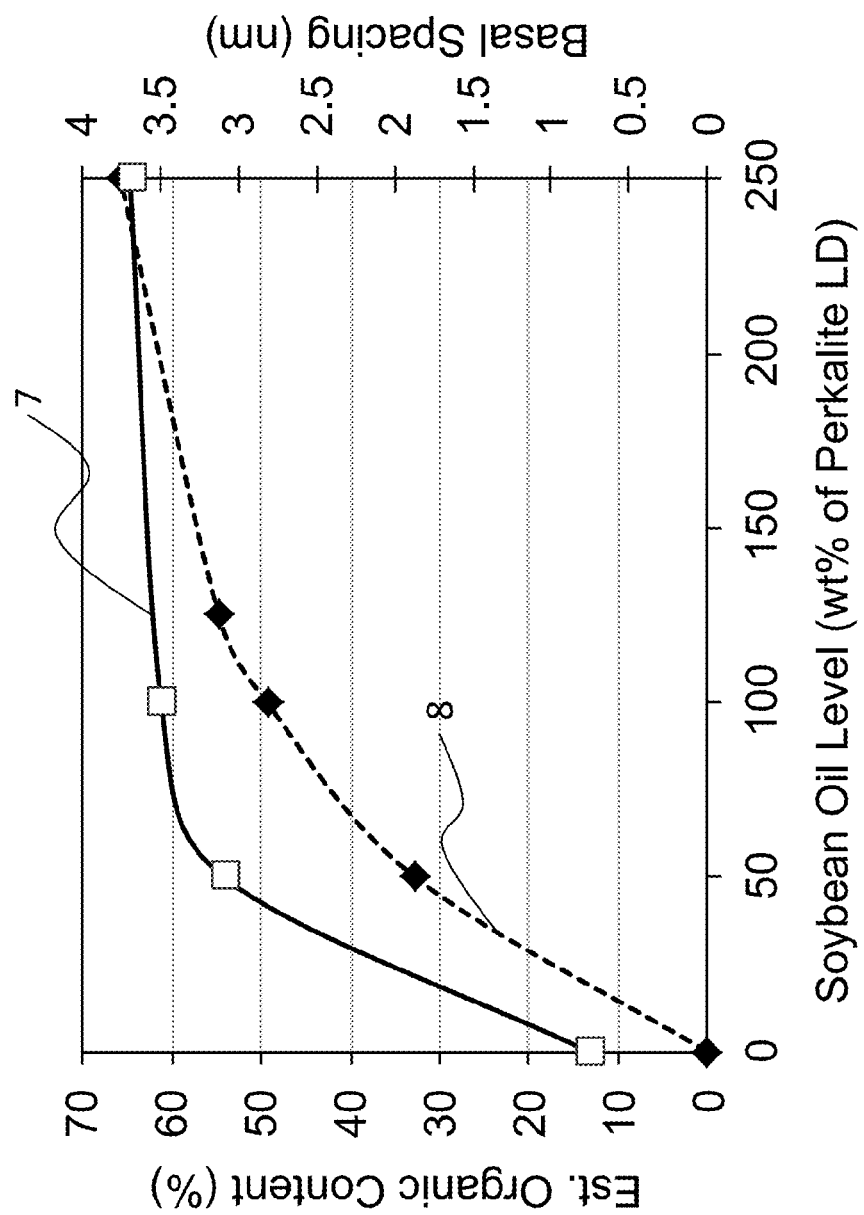
FIG. 6 shows the basal spacing (solid curve 7) and estimated organic content (dashed curve 8) plotted versus the soybean oil level (as weight percent Perkalite® LD inorganic LDH).

All samples were tested by FTIR and the results showed clear indication of the presence of expected organic moieties. The basal spacing values of all samples were above 3 nm and showed a moderate increase with the soybean oil level (FIG. 6). The organic content of each sample was estimated based on thermogravimetric analysis (TGA) data and is shown in FIG. 6.

Example 4

Preparation of LDH/Resin Masterbatch

For this example, Promix® 400 homogenizing agent, a product of Flow Polymers, LLC, was used to prepare an exfoliated LDH masterbatch. Promix® 400 is a homogenizing agent that is widely used in tires, especially tire innerliners, to improve the compatibility of dissimilar elastomers. It is a proprietary blend of various hydrocarbon resins in a hard pellet form, with a softening point at approximately 100° C.

To prepare the masterbatch, 200 grams of Promix® 400 homogenizing agent was added to an aluminum can and heated to a temperature of 232° C. (450° F.). Then, 100 grams of LDH-SB50 (pre-ground to a fine powder using a commercial coffee bean grinder) was quickly added. The mixture was mechanically stirred for 1 hour with a gradual but significant increase in viscosity being observed during the mixing period. After mixing, the blend was thermally quenched, collected and ground into a fine powder. Good dispersion quality was observed as the product appeared quite uniform and was free of any visible aggregates.

Figure 7:
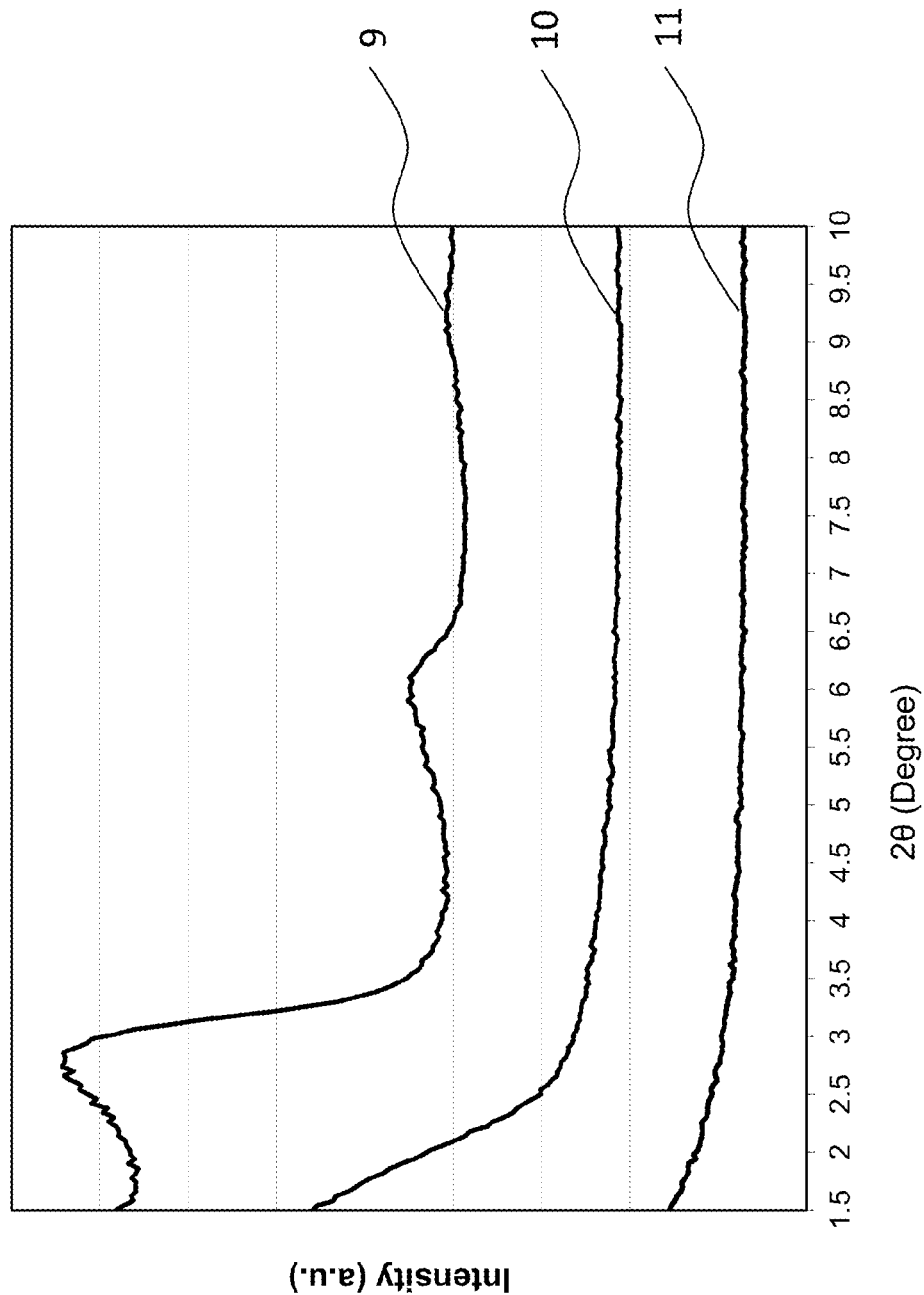
FIG. 7 shows three X-ray diffraction profiles including LDH-SB50 9 made in Example 3 and used in Example 4, a blend of Promix® 400 additive with LDH-SB50 10 produced in Example 4, and Promix® 400 additive 11.

The Promix® homogenizing agent/LDH-SB50 product was tested by XRD and the result is shown as trace 10 in FIG. 7, in comparison to LDH-SB50 (trace 9 in FIG. 7) and neat Promix® 400 homogenizing agent (trace 11 in FIG. 7). Surprisingly, the Promix® 400 homogenizing agent/LDH-SB50 showed no diffraction peaks (only an upward shoulder at low angles). The result suggests that the LDH layers were largely exfoliated in the blend.

Example 5

Rubber Compounds Containing LDH/Resin Masterbatch

The Promix® 400 homogenizing agent/LDH-SB50 masterbatch was studied in rubber compounds to evaluate their effect on physical and barrier properties. The rubber compounds studied were based on typical 80/20 innerliner formulations (the weight ratio of bromobutyl rubber to natural rubber being 80/20), which is shown in Table 3. It should be noted that blends containing from about 60 weight percent to about 90 weight percent of a halobutyl rubber and from about 10 weight percent to about 40 weight percent natural rubber are commonly used in tire innerliner formulations. In another scenario, the tire innerliner formulation can contain from 90 to 100 percent halobutyl rubber and up to 10 percent natural rubber. Sample 1 (containing 10 phr of neat Promix® 400 homogenizing agent) served as the control. The rubber compounds were prepared by first blending the bromobutyl rubber (Bromobutyl 2222 from ExxonMobil Chemical), natural rubber, stearic acid and either Promix® 400 homogenizing agent or Promix/LDH-SB50 in a Brabender-type internal mixer at 80° C. for 5 minutes and were then mixing in the curatives (zinc oxide, sulfur and MBTS) using an open two-roll mill. The rubber compounds were fully cured at 170° C. for 30 minutes.

TABLE 3

Typical innerliner formulation compounds of Example 5

| | Sample | | |
|---|---|---|---|
| | 1 | 2 | 3 |
| Formulation | | | |
| Bromobutyl 2222 | 80 | 80 | 80 |
| Natural Rubber | 20 | 20 | 20 |
| Promix ® 400 | 10 | — | — |
| Promix/LDH-SB50 | — | 10 | 15 |
| Stearic Acid | 2 | 2 | 2 |
| ZnO | 1 | 1 | 1 |
| Sulfur | 0.5 | 0.5 | 0.5 |
| MBTS | 1.2 | 1.2 | 1.2 |
| Properties | | | |
| 100% Modulus | 100 | 106.6 | 103.7 |
| 300% Modulus | 100 | 120.5 | 114.6 |
| Tensile Strength | 100 | 106.7 | 92.9 |
| OTR | 100 | 85.6 | 80.4 |

The mechanical properties of cured rubber compounds were tested on a tensile instrument. The barrier performance was characterized by measuring the oxygen transmission rate (OTR) of cured rubber sheets at 23° C. and 0% humidity (ASTM D3985). Both results (normalized by setting the values of control sample to 100) are presented in Table 3. OTR showed a steady decrease with increasing levels of Promix®/LDH-SB50.

While certain representative embodiments and details have been shown for the purpose of illustrating the subject invention, it will be apparent to those skilled in this art that various changes and modifications can be made therein without departing from the scope of the subject invention.

What is claimed is:

1. A method for preparing an organically functionalized layered double hydroxide which comprises reacting (a) an inorganic layered double hydroxide, (b) a triglyceride oil, (c) an enzyme which is capable of catalyzing the hydrolysis of an ester, and (d) water, to enzymatically hydrolyze the triglyceride oil to yield long-chain fatty acids and glycerol which participate in an anion exchange process with the inorganic layered double hydroxide to swell the inorganic layered double hydroxide to produce the organically functionalized layered double hydroxide.

2. The method for preparing an organically functionalized layered double hydroxide as specified in claim 1 wherein the enzyme is a lipase enzyme.

3. The method for preparing an organically functionalized layered double hydroxide as specified in claim 1 wherein said reaction is carried out in an aqueous medium in the presence of a surfactant.

4. The method as specified in claim 1 wherein the triglyceride oil is hydrolyzed in the presence of the layered double hydroxide.

5. The method as specified in claim 1 wherein the triglyceride oil is at least partially hydrolyzed prior to the introduction of the inorganic layered double hydroxide.

6. A method for preparing an organically functionalized layered double hydroxide as specified in claim 1 which comprises (1) dispersing into an aqueous medium (a) the inorganic layered double hydroxide, (b) the triglyceride oil, and (c) the enzyme, (2) allowing the triglyceride oil to hydrolyze into long-chain fatty acids and glycerol to produce a dispersion of the organically functionalized layered double hydroxide; and (3) recovering the organically functionalized layered double hydroxide from the aqueous dispersion.

7. The method as specified in claim 2 wherein the lipase from *Thermomyces lanuginosus*.

8. The method as specified in claim 1 wherein the inorganic layered double hydroxide is of the formula: $[M^{2+}_{1-x}M^{3+}_{x}(OH)_2]^{x+}A^{n-}_{x/n}\cdot mH_2O$, wherein $M^{2+}$ represents a divalent metal cation, wherein $M^{3+}$ represents a trivalent metal cation, wherein x is equal to the $M^{3+}/(M^{2+}+M^{3+})$ ratio, and wherein $A^{n-}$ represents the interlayer anion of valence n.

9. The method as specified in claim 1 which further comprises drying the organically functionalized layered double hydroxide.

10. The method as specified in claim 1 which is conducted at a temperature which is within the range of 10° C. to 90° C.

11. The method as specified in claim 1 which is conducted at a temperature which is within the range of 20° C. to 70° C.

12. The method as specified in claim 1 which is conducted at a temperature which is within the range of 30° C. to 50° C.

* * * * *